US010259425B2

(12) United States Patent
Lee et al.

(10) Patent No.: US 10,259,425 B2
(45) Date of Patent: Apr. 16, 2019

(54) PRE-TENSIONER FOR SEAT BELT OF VEHICLES

(71) Applicants: Hyundai Motor Company, Seoul (KR); Kia Motors Corporation, Seoul (KR)

(72) Inventors: Inbum Lee, Seoul (KR); Dong Hyuk Kwak, Siheung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 125 days.

(21) Appl. No.: 15/662,132

(22) Filed: Jul. 27, 2017

(65) Prior Publication Data
US 2018/0281746 A1 Oct. 4, 2018

(30) Foreign Application Priority Data

Apr. 4, 2017 (KR) .................. 10-2017-0043803

(51) Int. Cl.
| | |
|---|---|
| *B60R 22/195* | (2006.01) |
| *B60R 22/24* | (2006.01) |
| *B60R 22/42* | (2006.01) |
| *B60R 22/40* | (2006.01) |
| *B60R 11/00* | (2006.01) |

(52) U.S. Cl.
CPC .......... *B60R 22/42* (2013.01); *B60R 22/1951* (2013.01); *B60R 22/1952* (2013.01); *B60R 22/1955* (2013.01); *B60R 22/24* (2013.01); *B60R 22/40* (2013.01); *B60R 2011/0029* (2013.01)

(58) Field of Classification Search
CPC ............ B60R 22/1951; B60R 22/1952; B60R 22/1954; B60R 22/1955; B60R 22/195; B60R 22/24; B60R 2011/0029
USPC ........................................ 280/806; 297/480
See application file for complete search history.

(56) References Cited

U.S. PATENT DOCUMENTS

| | | | | |
|---|---|---|---|---|
| 5,186,494 A | * | 2/1993 | Shimose | .............. B60N 2/4221 |
| | | | | 280/806 |
| 5,403,037 A | * | 4/1995 | Fohl | ..................... B60R 22/4652 |
| | | | | 280/806 |

(Continued)

FOREIGN PATENT DOCUMENTS

| | | | |
|---|---|---|---|
| EP | 2189337 A1 * | 5/2010 | ........... B60R 22/022 |
| JP | 4650002 B2 * | 3/2011 | |
| JP | 5076789 B2 * | 11/2012 | |

*Primary Examiner* — Keith J Frisby
(74) *Attorney, Agent, or Firm* — Morgan, Lewis & Bockius LLP

(57) ABSTRACT

A pre-tensioner for a safety belt of vehicles is provided. The pre-tensioner for a safety belt of a vehicle that is disposed in a side sill of the vehicle and that operates to pull the safety belt by pushing a piston into a tube by a high pressure gas of a gas generator using explosive power of gunpowder that is configured at one side of a bracket in a state in which the piston is connected to the safety belt through a wire within the tube including: internal and external weldnuts that are fixed to each one side of internal and external side surfaces of the side sill, wherein by penetrating the side sill in a vehicle width direction by forming a screw at an external circumference of both end portions of the tube, the both end portions are engaged with the internal and external weldnuts, respectively.

7 Claims, 4 Drawing Sheets

(56) References Cited

U.S. PATENT DOCUMENTS

| | | | | |
|---|---|---|---|---|
| 6,238,003 B1* | 5/2001 | Miller | ............... | B60R 22/1951 |
| | | | | 297/480 |
| 8,414,028 B2* | 4/2013 | Miyajima | ............... | B60R 22/24 |
| | | | | 280/806 |
| 9,481,341 B2* | 11/2016 | Effenberger | ........ | B60R 22/1952 |
| 2002/0105181 A1* | 8/2002 | Specht | ............... | B60R 22/1951 |
| | | | | 280/806 |
| 2006/0038391 A1* | 2/2006 | Bell | ............... | B60R 22/022 |
| | | | | 280/807 |
| 2007/0013186 A1* | 1/2007 | Bell | ............... | B60R 22/1951 |
| | | | | 280/806 |
| 2009/0108577 A1* | 4/2009 | Hirotani | ............... | B60R 22/1951 |
| | | | | 280/802 |
| 2012/0049501 A1* | 3/2012 | Fujii | ............... | B60R 22/023 |
| | | | | 280/806 |
| 2018/0281746 A1* | 10/2018 | Lee | ............... | B60R 22/42 |

* cited by examiner

PRE-TENSIONER FOR SEAT BELT OF VEHICLES

CROSS-REFERENCE TO RELATED APPLICATION

The present application claims priority to Korean Patent Application No. 10-2017-0043803 filed on Apr. 4, 2017, the entire contents of which is incorporated herein for all purposes by this reference.

BACKGROUND OF THE INVENTION

Field of the Invention

The present invention relates to a pre-tensioner for a safety belt of vehicles. More particularly, the present invention relates to a pre-tensioner for a safety belt of vehicles that can secure a space within a vehicle room while improving vehicle body rigidity.

Description of Related Art

In general, when a vehicle collides, by securing an upper body of a passenger, a safety belt that is installed in the vehicle prevents a secondary collision of the passenger and mitigates an impact.

That is, when the vehicle collides, the safety belt prevents the passenger from ejecting to the outside of the vehicle and recently, in a most general form, a 3-point safety belt that is combined with a shoulder belt for securing a shoulder and a lap belt for securing a waist is generally used.

When the vehicle collides, there is a problem that such a safety belt cannot completely fix a passenger body to a seat because of acceleration.

Further, the safety belt is interlocked with a Supplementary Restraint System (SRS) to mitigate an impact that is applied to the passenger.

In the present case, when the airbag explodes, a considerable impact occurs and a high temperature of 300-400° C. occurs.

Therefore, when the safety belt loosely fixes the passenger, there is a problem that the passenger is injured by an airbag.

In order to prevent such a problem, a pre-tensioner is applied to the safety belt.

When a collision is detected, the pre-tensioner instantaneously pulls to come in close contact with the safety belt, thereby strongly securing the passenger by the safety belt.

That is, when a collision detecting detector detects a vehicle collision, a gas generation apparatus such as gunpowder that is charged therein operates and thus by pulling to instantaneously come in close contact with the safety belt by an expansive force of a gas, the pre-tensioner protects the passenger.

When the vehicle collides, such a pre-tensioner performs an important operation to the passenger and thus research and development of a simple structure that can enhance a use value is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a pre-tensioner for a safety belt of vehicles having advantages of being configured for improving rigidity of a side sill even without a separate reinforcement member by mounting the tube to penetrate the side sill of the vehicle by disposing a wire that secures the safety belt and a tube that receives a piston in a vehicle width direction, when the vehicle collides.

The present invention has been made in an effort to further provide a pre-tensioner for a safety belt of vehicles having advantages of being configured for minimizing a foot hook phenomenon when a back seat occupant gets on by inserting the tube into a side sill.

Various aspects of the present invention are directed to providing a pre-tensioner for a safety belt of a vehicle that is disposed in a side sill of the vehicle and that operates to pull the safety belt by pushing a piston into a tube by a high pressure gas of a gas generator using explosive power of gunpowder that is configured at one side of a bracket in a state in which the piston is connected to the safety belt through a wire within the tube including: internal and external weldnuts that are fixed to each one side of internal and external side surfaces of the side sill, wherein by penetrating the side sill in a vehicle width direction by forming a screw at an external circumference of both end portions of the tube, the both end portions are engaged with the internal and external weldnuts, respectively.

In an internal end portion of the tube, gear teeth may be formed, and the pre-tensioner may further include an engaging gear that is rotatably disposed through a rotation guider at one side of the bracket to be engaged with the gear teeth.

In the tube, an external diameter of an internal end portion in which the screw is formed may be greater than an entire external diameter.

An internal diameter of the internal weldnut may be greater than that of the external weldnut.

At the internal to a front end portion of the piston, a cone-shaped curved surface may be formed, and a plurality of return prevention balls may be interposed between a circumference of the curved surface and an internal circumference of the tube to suppress a return operation of the piston.

Sealing may be inserted and disposed between an external circumference of the front end portion of the piston and the tube.

In a state that the gas generator is fixed and disposed at one side of the bracket, the gas pipe may be disposed and disposed to correspond to the front end portion of the piston.

According to an exemplary embodiment of the present invention, a tube is disposed in a vehicle width direction to be engaged through internal and external weldnuts that are configured at internal and external side surfaces, respectively, of a side sill of a vehicle, and thus rigidity of the side sill can be improved even without applying a separate reinforcement member while performing a function of a pre-tensioner.

Further, according to an exemplary embodiment of the present invention, by inserting the tube into the side sill, when a back seat occupant gets on, a foot hook phenomenon can be minimized.

Further, according to an exemplary embodiment of the present invention, when assembling in the side sill, by forming a diameter of a tube in an entering direction to be smaller than that of a tube in an entering opposite direction, an assembly capability can be improved.

In addition, an effect that may be obtained or estimated by an exemplary embodiment of the present invention is directly or implicitly described in a detailed description of an exemplary embodiment of the present invention.

That is, various effects that are estimated according to an exemplary embodiment of the present invention will be described within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
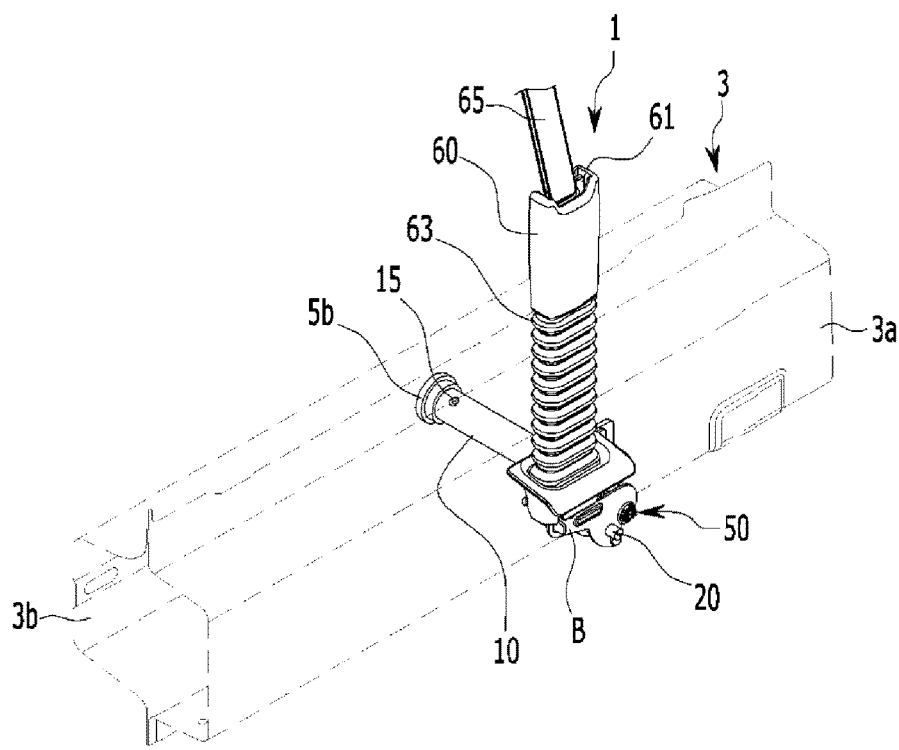
FIG. 1 is a projection perspective view in which a pre-tensioner for a safety belt of vehicles is disposed according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
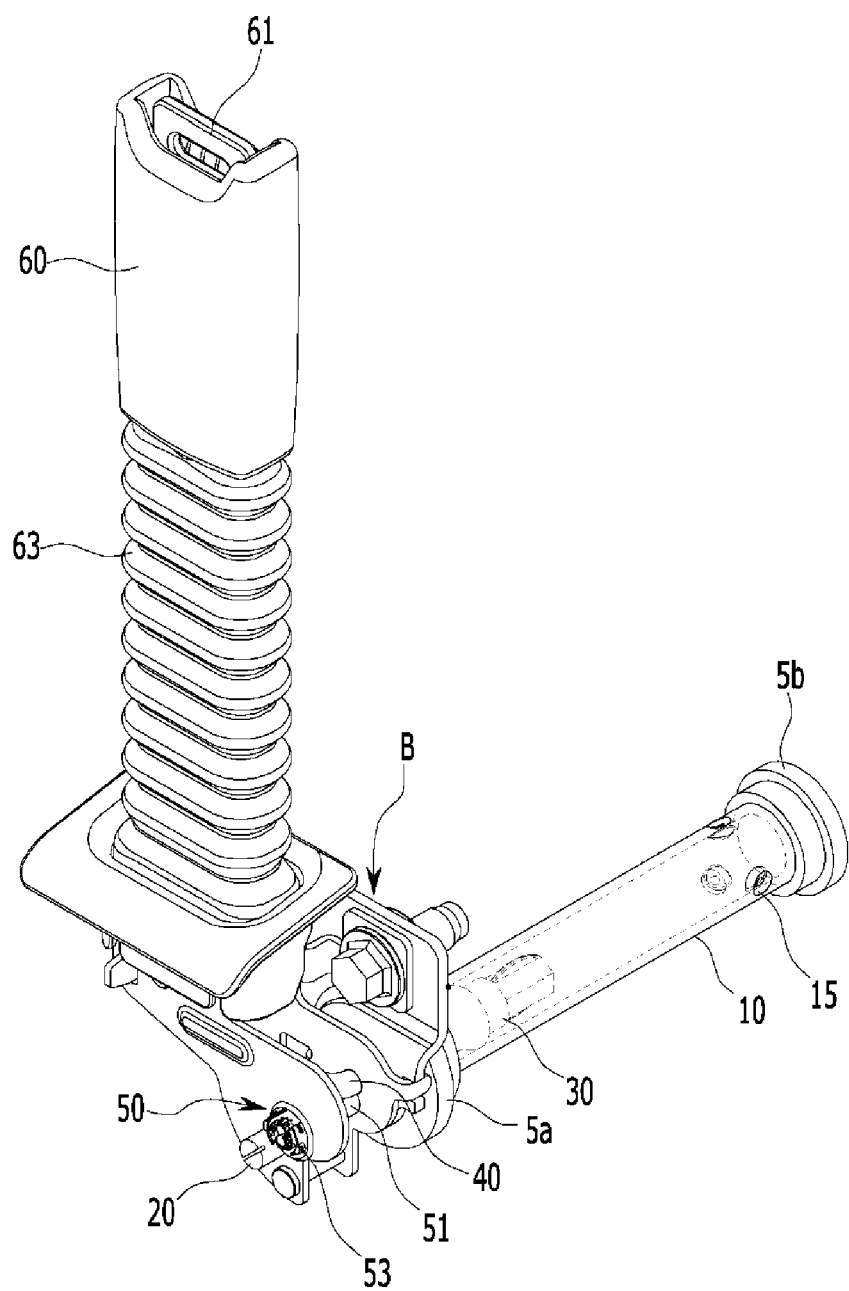
FIG. 2 is a perspective view illustrating a pre-tensioner for a safety belt of vehicles according to an exemplary embodiment of the present invention.
Figure 3:
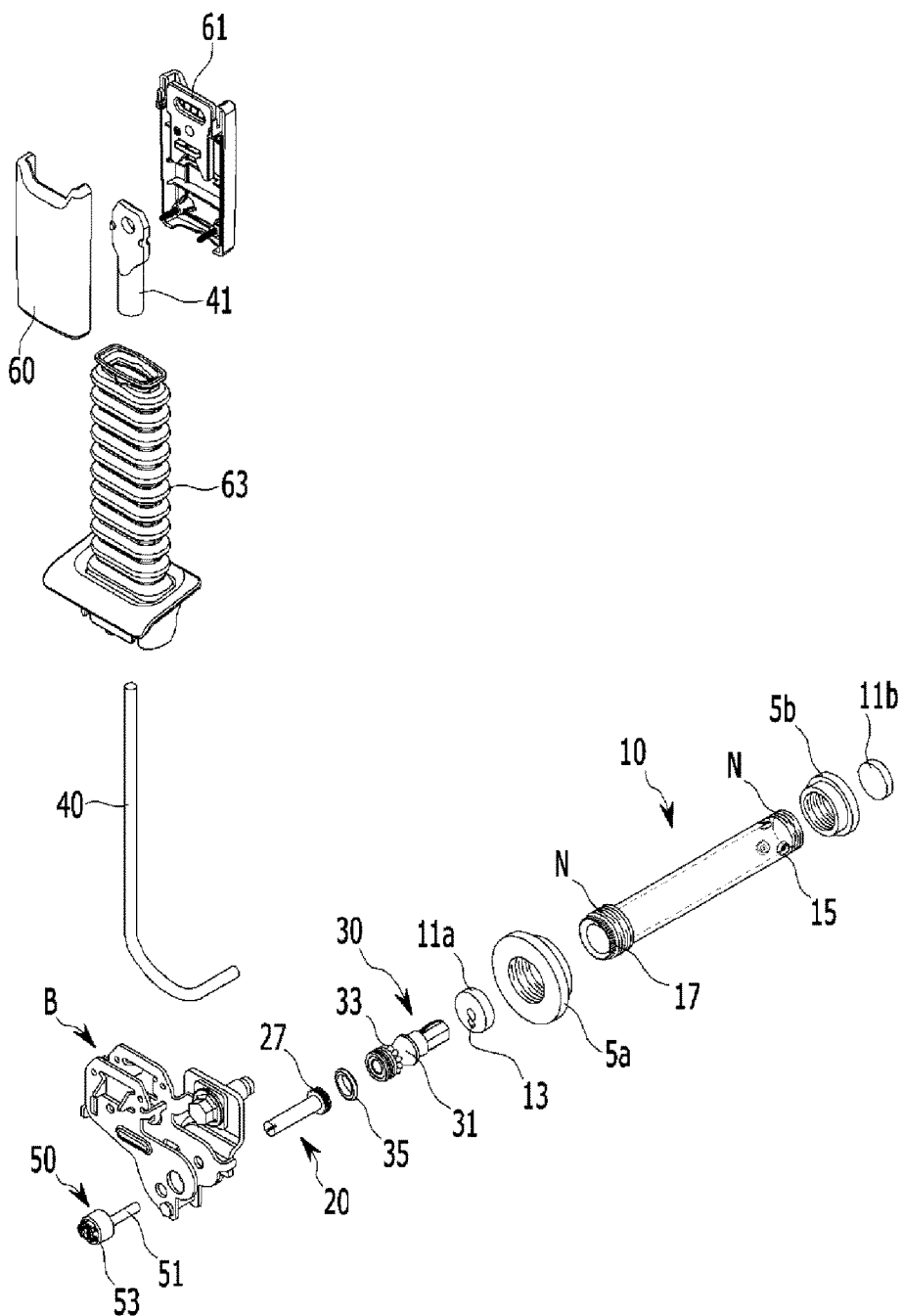
FIG. 3 is an exploded perspective view of a pre-tensioner for a safety belt of vehicles according to an exemplary embodiment of the present invention.
Figure 4:
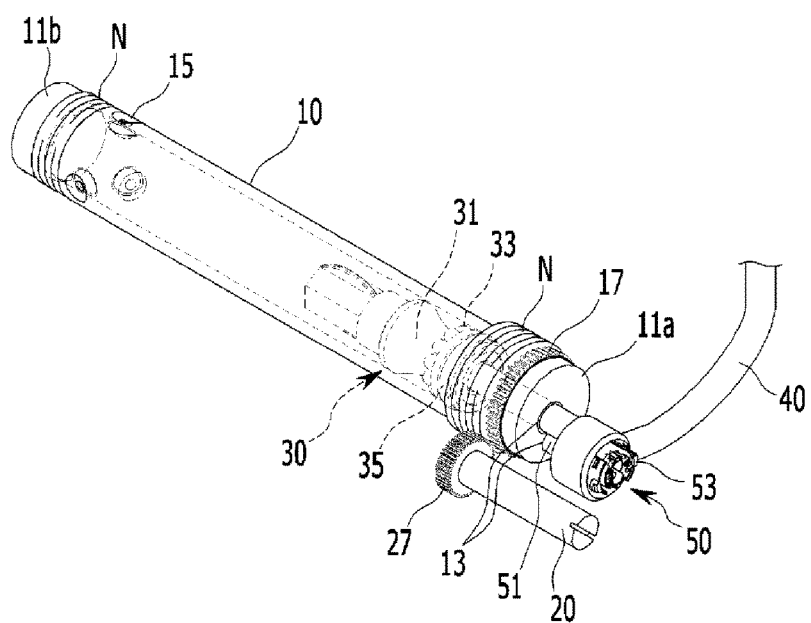
FIG. 4 is a partial enlarged view of a pre-tensioner for a safety belt of vehicles according to an exemplary embodiment of the present invention.

FIG. 1 is a projection perspective vie in which a pre-tensioner for a safety belt of vehicles is disposed according to an exemplary embodiment of the present invention, FIG. 2 is a perspective view illustrating a pre-tensioner for a safety belt of vehicles according to an exemplary embodiment of the present invention, FIG. 3 is an exploded perspective view of a pre-tensioner for a safety belt of vehicles according to an exemplary embodiment of the present invention, and FIG. 4 is a partial enlarged view of a pre-tensioner for a safety belt of vehicles according to an exemplary embodiment of the present invention.

Referring to FIG. 1, a pre-tensioner 1 (hereinafter, a pre-tensioner) for a safety belt of a vehicle according to an exemplary embodiment of the present invention is disposed at a space that supports a foot of a passenger within a vehicle room.

The pre-tensioner 1 is disposed to penetrate a side sill 3 of the vehicle and performs a function of early securing a pelvic region of a passenger, when the vehicle collides.

That is, when the vehicle collides, the pre-tensioner 1 is operated to perform a function of pulling a safety belt 65 such that a passenger body comes in close contact with a seat by the safety belt 65.

Such a pre-tensioner 1 is disposed in a vehicle width direction in the side sill 3 corresponding to the low end portion of a center pillar of the vehicle and is disposed to penetrate the side sill 3.

In the instant case, in the side sill 3, at each one side of an internal side surface 3a and an external side surface 3b, an internal weldnut 5a and an external weldnut 5b are fixed.

Here, in the internal side surface 3a and the external side surface 3b of the side sill 3, the side sill 3 adjacent to the internal to the vehicle room is referred to as an internal side surface 3a and the side sill 3 of a direction opposite to thereto is referred to as an external side surface 3b.

Further, an internal diameter of the internal weldnut 5a may be formed greater than that of the external weldnut 5b.

For example, when the internal weldnut 5a uses a specification of M10, the external weldnut 5b may use a specification of M12.

Referring to FIG. 2, FIG. 3 and FIG. 4, the pre-tensioner 1 according to an exemplary embodiment of the present invention includes a tube 10, a rotation guider 20, a piston 30, a wire 40, and a gas generator 50.

First, the tube 10 is formed in a cylindrical shape, and at both end portions thereof, an internal cap 11a and an external cap 11b are configured.

In the instant case, the internal cap 11a is a portion corresponding to the internal weldnut 5a, and the external cap 11b is a portion corresponding to the external weldnut 5b.

At the internal cap 11a, the wire 40 and a gas pipe 51 of a gas generator 50 to be described hereinafter are penetrated and thus a penetration hole 13 is formed to insert into the tube 10.

Such an internal cap 11a and external cap 11b may be assembled with a forced fitting method in both end portions of the tube.

In a state in which the wire 40 and the gas pipe 51 are inserted through the penetration hole 13, the tube 10 may be assembled in the internal and external weldnuts 5a and 5b and the internal cap 11a may be inserted into the tube 10.

Further, at an external circumference of both end portions of the tube 10, a screw N is formed.

Both end portions of such a tube 10 are engaged with the internal and external weldnuts 5a and 5b, respectively that are fixed to the side sill 3 through the screw N.

Further, in the tube 10, at an adjacent position of the screw N corresponding to the external weldnut 5b, a plurality of air vent holes 15 are formed along a circumference thereof.

When the piston 30 is inserted into the tube 10, the air vent hole 15 is a hole that vents air existing within the tube 10.

Further, in an internal end portion of the tube 10, gear teeth 17 are formed.

That is, at an internal end portion of the tube 10, the screw N and the gear teeth 17 adjacent to the screw N are formed, and at an external end portion thereof, the screw N and the air vent hole 15 are formed.

Further, in the tube 10, an external diameter of an internal end portion in which the screw N and the gear teeth 17 are formed may be formed greater than an entire external diameter.

This enables the tube 10 to easily enter into the side sill 3 when assembling the tube 10 in the side sill 3, and the tube 10 may have different diameters together with the internal and external weldnuts 5a and 5b.

The rotation guider 20 is rotatably disposed through a bracket B that is connected to the tube 10.

That is, the rotation guider 20 is disposed at one side of the bracket B to rotate the tube 10.

To engage with the gear teeth 17 of the tube 10, in such a rotation guider 20, an engaging gear 27 corresponding to the gear teeth 17 is formed.

In other words, the rotation guider 20 is configured to assemble the tube 10 with the internal and external weldnuts 5a and 5b of the side sill 3.

In a state that the rotation guider 20 is supported through the bracket B, the rotation guider 20 is engaged with the tube 10 to rotate the tube 10.

At one end surface of such a rotation guider 20, a groove that may insert a driver to rotate the rotation guider 20 is formed.

The piston 30 is inserted into the tube 10 to perform a sliding movement.

The internal to a front end portion of the piston 30 is formed in a cone-shaped curved surface 31.

That is, the front end portion of the piston 30 has a small diameter toward the internal cap 11a.

Such a piston 30 includes a plurality of return prevention balls 33 that are interposed between a circumference of the curved surface 31 and an internal circumference of the tube 10.

In the instant case, when the vehicle collides, the return prevention balls 33 are applied to prevent the piston 30 from being inserted into the tube 10 to the maximum and again drawing out from the tube 10.

That is, when the return prevention balls 33 are inserted into the tube 10 to the maximum and again draws out from the tube 10, the return prevention balls 33 move in a withdrawal opposite direction to be inserted between the piston 30 and the tube 10.

Accordingly, the piston 30 may be returned to an initial state to prevent the safety belt 65 from being loosened.

Further, sealing 35 is inserted and disposed between an external circumference of a front end portion of the piston 30 and the tube 10.

Therefore, a micro gap may occur between the tube 10 and an internal circumference of the piston 30, while an explosion gas is leaked by such a micro gap, a gas pressure deteriorates to prevent a force that inserts the piston 30 into the tube 10 from being deteriorated.

The wire 40 is connected to the safety belt 65, and when the vehicle collides, the wire 40 is rapidly inserted together with the piston 30 into the tube 10, performing a function of pulling the safety belt 65.

One end portion of such a wire 40 is connected to the piston 30, and the other end portion thereof is connected to a wire ring 41.

The wire 40 includes a flexible material to be flexibly bent when inserted into the tube 10.

In the instant case, when simply describing a cover 60 of the safety belt 65 in which the wire ring 41 is received, at the internal to the cover 60, the wire ring 41 that is connected to the wire 40 is configured, and a buckle 61 moving on the safety belt 65 with connected to the wire ring 41 is configured.

Further, in a lower end portion of the cover 60, a bellow-shaped connection pipe 63 is configured to receive the wire 40.

The gas generator 50 is fixed to the other side of the bracket B.

The gas generator 50 is disposed and disposed such that the gas pipe 51 corresponds to the front end portion of the piston 30 through the penetration hole 13 of the internal cap 11a.

That is, one end portion of the gas generator 50 contacts the piston 30, and the other end portion thereof is connected to a connector 53 that applies electricity such that gunpowder that is charged therein explodes.

Such a gas generator 50 receives an input of an electrical signal through the connector 53 to insert the piston 30 into the tube 10 with explosive power occurring while gunpowder of the inside explodes.

Therefore, in the pre-tensioner 1 according to an exemplary embodiment of the present invention, because the tube 10 is disposed in a vehicle width direction to be engaged through the internal and external weldnuts 5a and 5b that are configured in the side sill 3 of the vehicle, when a back seat occupant gets on, the pre-tensioner 1 is applied as a reinforcement member of the side sill 3 while minimizing a foot hook phenomenon to reinforce rigidity of the side sill 3 without applying a separate reinforcement member.

Further, the pre-tensioner 1 according to an exemplary embodiment of the present invention forms a diameter of the tube corresponding to the internal weldnut 5a to be greater than that of an entire tube and thus when the pre-tensioner 1 is assembled in the side sill, the pre-tensioner 1 is easily entered, improving an assembling capability.

Further, by applying to engage the rotation guider 20 with the tube 10, the pre-tensioner 1 according to an exemplary embodiment of the present invention can perform assembly even without a separate assembly instrument when assembling the tube 10.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pre-tensioner for a safety belt that is disposed in a side sill of a vehicle and that operates to pull the safety belt by pushing a piston into a tube by a high pressure gas of a gas generator using explosive power of gunpowder that is configured at one side of a bracket in a state in which the piston is connected to the safety belt through a wire within the tube, the pre-tensioner comprising:
    internal and external weldnuts that are fixed to each one side of internal and external side surfaces of the side sill, wherein by penetrating the side sill in a vehicle width direction by forming a screw at an external circumference of first and second end portions of the tube, the first and second end portions are engaged with the internal and external weldnuts, respectively.

2. The pre-tensioner of claim 1, wherein at an internal end portion of the tube, gear teeth are formed, and wherein the pre-tensioner further includes an engaging gear that is rotatably disposed through a rotation guider at one side of the bracket to be engaged with the gear teeth.

3. The pre-tensioner of claim 1, wherein in the tube, an external diameter of an internal end portion in which the screw is formed is greater than an entire external diameter.

4. The pre-tensioner of claim 1, wherein an internal diameter of the internal weldnut is greater than that of the external weldnut.

5. The pre-tensioner of claim 1, wherein at the internal to a front end portion of the piston, a cone-shaped curved surface is formed, and a plurality of return prevention balls are interposed between a circumference of the curved surface and an internal circumference of the tube to suppress a return operation of the piston.

6. The pre-tensioner of claim 1, wherein sealing is inserted and disposed between an external circumference of a front end portion of the piston and the tube.

7. The pre-tensioner of claim 1, wherein in a state that the gas generator is fixed and disposed at one side of the bracket, a gas pipe is disposed to correspond to the front end portion of the piston.

* * * * *